US006892183B1

(12) United States Patent
Cooper et al.

(10) Patent No.: US 6,892,183 B1
(45) Date of Patent: May 10, 2005

(54) METHOD AND APPARATUS FOR GENERATING AN ITEM MENU FOR USE DURING OPERATION OF A SELF-SERVICE CHECKOUT TERMINAL

(75) Inventors: Brian P. Cooper, Suwanee, GA (US); Dusty L. Lutz, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 889 days.

(21) Appl. No.: 09/217,725

(22) Filed: Dec. 21, 1998

(51) Int. Cl.$^7$ .............................................. G06F 17/60
(52) U.S. Cl. ............................. 705/16; 705/20; 705/23; 235/383; 186/61
(58) Field of Search ............................. 705/16, 17, 20, 705/21, 23, 29, 400; 902/22; 235/383; 186/61; 707/2, 6

(56) References Cited

U.S. PATENT DOCUMENTS

| | | | | |
|---|---|---|---|---|
| 4,964,053 A | * | 10/1990 | Humble | 186/61 |
| 5,115,888 A | * | 5/1992 | Schneider | 186/61 |
| 5,329,609 A | * | 7/1994 | Sanada et al. | 704/251 |
| 5,426,282 A | * | 6/1995 | Humble | 235/383 |
| 5,771,378 A | * | 6/1998 | Holt et al. | 707/6 |
| 5,870,716 A | * | 2/1999 | Sugiyama et al. | 705/16 |
| 5,987,428 A | * | 11/1999 | Walter | 705/23 |
| 6,000,610 A | * | 12/1999 | Talbott et al. | 235/383 |
| 6,089,454 A | * | 7/2000 | Sadler | 235/383 |
| 6,168,076 B1 | * | 1/2001 | Yamamoto et al. | 705/16 |
| 6,208,976 B1 | * | 3/2001 | Kinebuchi et al. | 705/16 |

OTHER PUBLICATIONS

Wetzstein, Cheryl, "Shoppers Check Out Self–Serve Scanner", The Washington Times, vol. 9, No. 154, Aug. 2, 1990.*
Gladson, Ted, "Provide the Services Your Customers Expect", Drug Store News, vol. 0, No. 0, p. 42, Jul. 5, 1993.*
Kimberlin, Joanne, "Grocery Chain Winn Dixie Brings Self–Scan Checkout to Eastern Virginia", Knight–Ridder Tribune Business News, Newport News, Virginia, Aug. 19, 1998.*

* cited by examiner

Primary Examiner—John W. Hayes
(74) Attorney, Agent, or Firm—Maginot, Moore & Beck LLP

(57) ABSTRACT

A method of displaying an item name having a first word, a second word, and a third word on an item list of an item selection menu of a retail terminal includes the step of displaying a first version of the item name on the item list of the item selection menu such that the first word is followed by the second word which is followed by the third word. The method also includes the step of displaying a second version of the item name on the item list of the item selection menu such that the second word is followed by the first word which is followed by the third word. Moreover, the method includes the step of displaying a third version of the item name on the item list of the item selection menu such that the third word is followed by the first word which is followed by the second word. A retail terminal is also disclosed.

17 Claims, 8 Drawing Sheets

METHOD AND APPARATUS FOR GENERATING AN ITEM MENU FOR USE DURING OPERATION OF A SELF-SERVICE CHECKOUT TERMINAL

CROSS REFERENCE

Cross reference is made to copending U.S. patent application Ser. No. 09/217,544, entitled "Method and Apparatus for Entering an Item Name into a Self-Service Checkout Terminal" by Dusty L. Lutz, Brian P. Cooper, and Jackie L. Huffman, which is assigned to the same assignee as the present invention, and which is filed concurrently herewith.

TECHNICAL FIELD OF THE INVENTION

The present invention relates generally to a self-service checkout terminal, and more particularly to a method and apparatus for generating an item menu for use during operation of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her items for purchase without the assistance of the retailer's personnel.

However, in particular to a grocery store, there are a relatively large number of items available in the store that do not have a bar code such as a universal product code (UPC) associated therewith. Generally, those items not having a bar code associated therewith are items whose price is based upon the weight of the item. Examples of such items include bulk foods, store prepared foods, and produce such as fruits and vegetables which are typically sold based on the weight of the item(s) to be purchased. The trend in the supermarket industry has been to determine the weight of an un-scannable item at the checkout terminal during the checkout process by using a weight scale (typically associated with a slot scanner device). What is meant herein by the use of the term "un-scannable" item is an item that is manually entered into a checkout terminal (i.e. entered in a manner other than by use of a scanner device).

In order to "key-in" or otherwise process an un-scannable item, a customer operating the self-service checkout terminal must place the un-scannable item on the weight scale and then perform a checkout procedure for the un-scannable item which involves the input of the identity of the us-scannable item. The identity of the un-scannable item is typically input into the self-service checkout terminal by entering an item code such as a product lookup (PLU) code with a keypad or a touch screen associated with the terminal. However, the customer may not readily know the item code associated with the un-scannable item.

A number of varying approaches have been taken in regard to entry of the item code into the self-service checkout terminal. One approach that has heretofore been utilized is to have retail personnel such as a retail clerk enter the item code associated with each un-scannable item either at the terminal itself or at a remote supervisory terminal connected to the self-service checkout terminal via the store's network. However, such an approach undesirably requires intervention into the customer's transaction by retail personnel thereby increasing labor costs associated with retailer's operation and potentially reducing the efficiency of the self-service checkout terminal if the terminal is idled while waiting for an available checkout clerk to enter the necessary item codes.

Another approach which has heretofore been utilized to enter the item code associated with un-scannable items is to place a book containing a list of all of the available item codes at a location near the self-service checkout terminal. However, use of such a book is inherently slow and it is difficult for the retailer to keep the book up-to-date thereby potentially causing confusion for the customer. Yet another approach which has been taken is to display an item selection menu on the display monitor associated with the self-service checkout terminal for use by the customer. Such item selection menus which have heretofore been designed contain an item list of each of the un-scannable items sold by the retailer. Such an item list is grouped into a number of categories based on the type of the item. For example, all fruits are placed in one category, all vegetables are placed in another category, and all bulk foods are placed in yet another category.

However, use of such an item list has a number of drawbacks associated therewith. For example, if the customer chooses an incorrect category at the beginning of his or her search attempt, he or she is likely not to find the item he or she is attempting to find. For example, if the customer chooses the "vegetables" category in an attempt to find tomatoes, the customer may not locate the desired item (i.e. tomatoes) if the retailer placed tomatoes in the "fruits" category. In addition, the item names are typically placed in alphabetical order within each category of the item selection menu. Hence, a customer attempting to locate "BELL PEPPERS" may be undesirably delayed if he or she is searching in the "B's" section of the list and the item name associated with bell peppers is actually located in the "P's" section of the list under the item name "PEPPERS, BELL".

What is needed therefore is a retail checkout terminal which overcomes one or more of the above-mentioned drawbacks. What is particularly needed is a method and apparatus for entering an item name of an un-scannable item into a self-service checkout terminal which allows the customer to quickly and efficiently find an item name in an item list of an item selection menu. What is further needed is a method and apparatus for generating an item selection menu that facilitates quick and efficient identification of a desired item name by a customer operating a self-service checkout terminal.

SUMMARY OF THE INVENTION

In accordance with a first embodiment of the present invention, there is provided a method of displaying an item name having a first word and a second word on an item list of an item selection menu of a retail terminal. The method includes the step of displaying a first version of the item name on the item list of the item selection menu such that the first word is followed by the second word. The method also includes the step of displaying a second version of the item name on the item list of the item selection menu such that the second word is followed by the first word.

In accordance with a second embodiment of the present invention, there is provided a method of displaying an item name having a first word, a second word, and a third word on an item list of an item selection menu of a retail terminal. The method includes the step of displaying a first version of the item name on the item list of the item selection menu such that the first word is followed by the second word which is followed by the third word. The method also includes the step of displaying a second version of the item name on the item list of the item selection menu such that the second word is followed by the first word which is followed by the third word. Moreover, the method includes the step of displaying a third version of the item name on the item list of the item selection menu such that the third word is followed by the first word which is followed by the second word.

In accordance with a third embodiment of the present invention, there is provided a retail terminal. The retail terminal includes a display monitor for displaying an item name having a first word and a second word on an item list of an item selection menu. The retail terminal also includes a processing unit electrically coupled to the display monitor. Moreover, the retail terminal includes a memory device electrically coupled to the processing unit. The memory device has stored therein a plurality of instructions which, when executed by the processing unit, causes the processing unit to (i) display a first version of the item name on the item list of the item selection menu with the display monitor such that the first word is followed by the second word, and (ii) display a second version of the item name on the item list of the item selection menu with the display monitor such that the second word is followed by the first word.

It is therefore an object of the present invention to provide a new and useful method and apparatus of operating a self-service checkout terminal.

It is moreover an object of the present invention to provide an improved method and apparatus for operating a self-service checkout terminal.

It is yet further an object of the present invention to provide a method and apparatus for entering an item name of an un-scannable item into a self-service checkout terminal which allows a customer to quickly and efficiently find an item name in an item list of an item selection menu.

It is yet another object of the present invention to provide a method and apparatus for generating an item selection menu that facilitates quick and efficient identification of a desired item name by a customer operating a self-service checkout terminal.

The above and other objects, features, and advantages of the present invention will become apparent from the following description and the attached drawings.

DETAILED DESCRIPTION OF THE INVENTION

Figure 1:
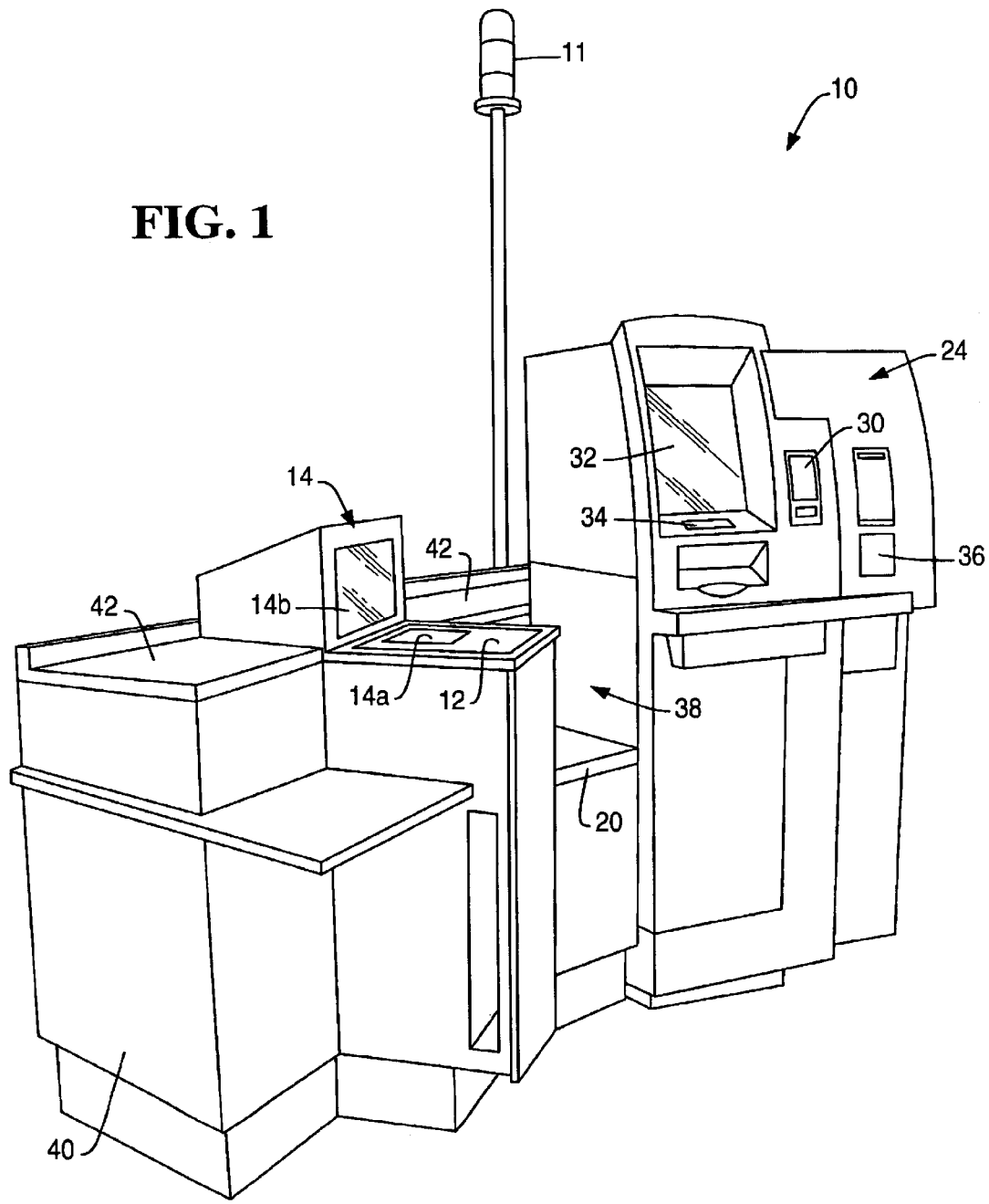
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a retail terminal such as a self-service checkout terminal 10 for use in a retail business such as a grocery store. The self-service checkout terminal 10 includes a summoning device such as a status light device 11, a product scale 12, a scanner 14, a bagwell scale 20, a card reader 30, a display monitor 32, a keypad 34, a printer 36, and a processing unit 26. The card reader 30, the display monitor 32, the keypad 34, and the printer 36 may be provided as separate components, or alternatively may preferably be provided as components of an automated teller machine (ATM) 24.

The self-service checkout terminal 10 also includes a bagwell 38 for accommodating one or more grocery bags (not shown) and a base 40 having a counter 42 secured thereto. The counter 42 defines an arcuate surface as shown in FIG. 1. Such an arcuate surface allows the scanner 14 to be positioned relatively close or otherwise proximate the ATM 24 and hence the components associated therewith. Such a configuration facilitates a user's (e.g. customer's) use of the self-service checkout terminal 10. Moreover, the bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 1. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item).

The display monitor 32 displays instructions which serve to guide a customer through a checkout procedure. For example, an instruction is displayed on the display monitor 32 which instructs the customer to enter an item into the self-service checkout terminal 10 by either passing the item over the scanner 14, or placing the item on the product scale 12 in order to obtain the weight of the item. Moreover, as shall be discussed below in more detail, the display monitor 32 is utilized to display an item selection menu which includes a list of all of the un-scannable items sold by the retailer. Such an item selection menu is particularly useful for checking out an item which cannot be scanned with the scanner 14. The display monitor 32 is preferably a known touch screen monitor which can generate data signals when certain areas of the screen are touched by a customer.

The status light device 11 is provided in order to notify store personnel, such as a customer service manager, if intervention into the customer's transaction is needed. In particular, as discussed in more detail below, the status light device 11 may display a first colored light (e.g. yellow light) in order to notify retail personnel that intervention is needed prior to the end of the customer's checkout transaction. Alternatively, the status light device 11 may display a second colored light (e.g. a red light) in order to notify retail personnel that intervention into the customer's transaction is needed immediately.

The bagwell scale 20 is a weight scale which monitors the weight of items placed in the bagwell 38 (i.e. into a grocery bag) or onto the portion of the counter 42 which is located proximate the bagwell 38. It should be appreciated that a customer may place an item onto the portion of the counter 42 proximate the bagwell 38 subsequent to entering the item, but prior to placing the item into a grocery bag. For example, if a customer scans a loaf of bread, the customer may want to place the bread onto the portion of the counter 42 proximate the bagwell 38 until one of the grocery bags is nearly full thereby preventing the bread from being crushed. Hence, the bagwell scale 20 may be utilized to monitor the ingress and egress of items into and out of the bagwell 38 along with onto and off of the counter 42. Such monitoring is particularly useful for preventing items which have not been scanned from being placed into a grocery bag.

Figure 2:
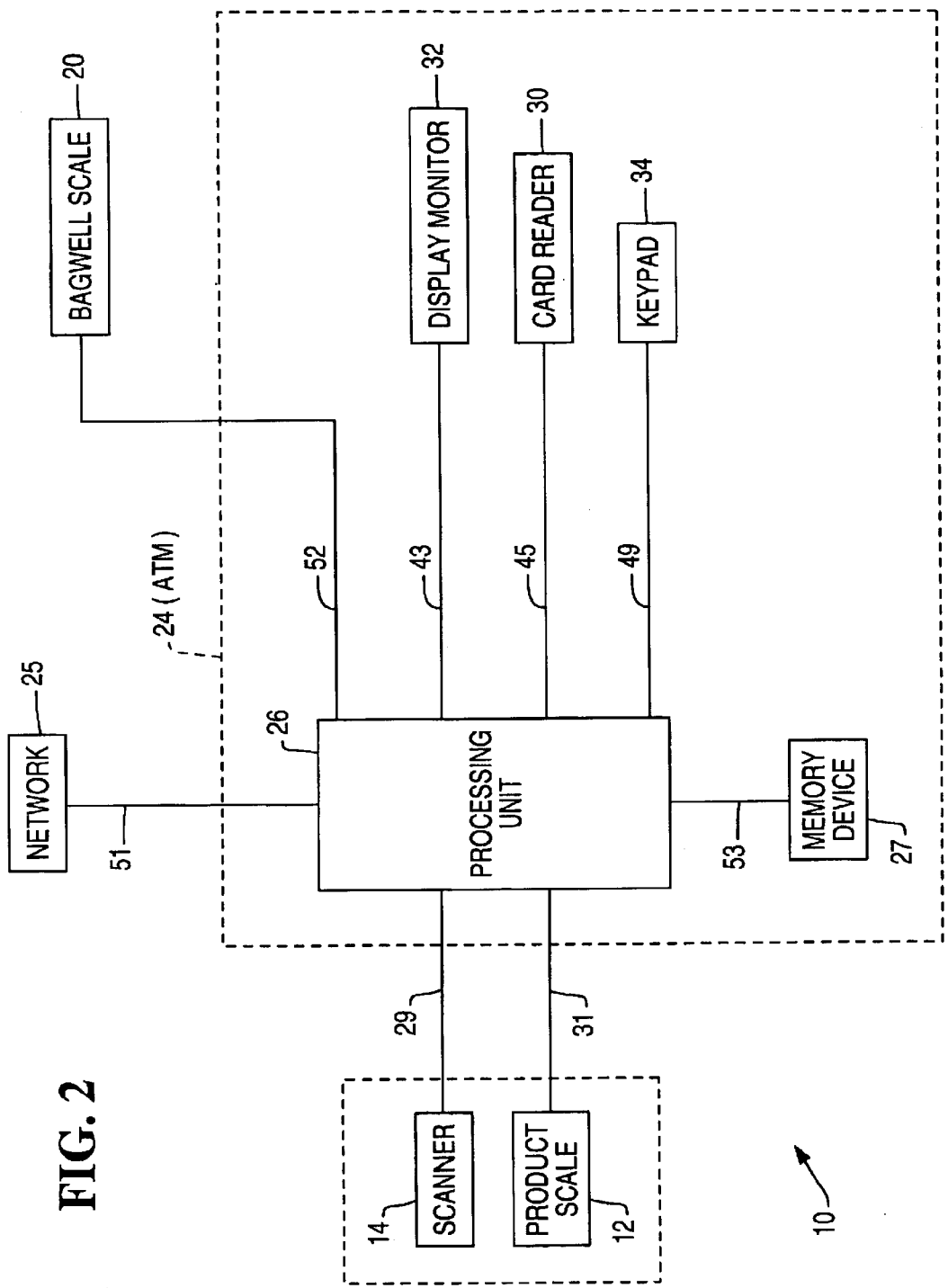
FIG. 2 is a simplified block diagram of the self-service checkout terminal of FIG. 1.

Referring now to FIG. 2, there is shown a simplified block diagram of the self-service checkout terminal 10. The processing unit 26 is electrically coupled to the product scale 12, the scanner 14, the bagwell scale 20, the card reader 30, the display monitor 32, and the keypad 34. The processing unit 26 is also electrically coupled to a network 25 and a memory device 27.

The processing unit 26 monitors output signals generated by the scanner 14 via a data communication line 29. In particular, when the customer scans an item which includes a product identification code across the scanning windows 14a, 14b, an output signal indicative of the product identification code is generated on the data communication line 29.

The processing unit 26 is coupled to the product scale 12 via a data communication line 31. In particular, when a customer places an item on the product scale 12, the product scale 12 generates an output signal on the data communication line 31 indicative of the weight of the item.

The processing unit 26 is coupled to the bagwell scale 20 via a data communication line 52. In particular, when a customer places an item into a grocery bag or onto the portion of the counter 42 proximate the bagwell 38, the bagwell scale 20 generates an output signal on the data communication line 52 indicative of the weight of the items in the grocery bags and on the portion of the counter 42 proximate the bagwell 20.

The processing unit 26 communicates with the display monitor 32 through a data communication line 43. The processing unit 26 generates output signals on the data communication line 43 which cause various instructional messages to be displayed on the display monitor 32. As alluded to above, the display monitor 32 may include known touch screen technology which can generate output signals when the customer touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, instructional messages may be generated with a voice generating device (not shown) or an audible tone generating device (not shown).

The keypad 34 is coupled to the processing unit 26 through a data communication line 49. The keypad 34 may include one or more of a known keypad or a touch pad. It should be appreciated that the touch screen associated with the display monitor 32 and the keypad 34 define input devices which may be utilized by a customer to input information associated with operation of the self-service checkout terminal 10. It should also be appreciated that numerous other input devices may also be utilized by the customer to input information associated with operation of the self-service checkout terminal 10.

Moreover, the card reader 30 is coupled to the processing unit through a data communication line 45. The card reader 30 may include a known credit, debit, loyalty, and/or smart card reader which is capable of reading information stored on the customer's card.

The processing unit 26 includes network interface circuitry (not shown) which conventionally permits the self-service checkout terminal 10 to communicate with the retailer's network 25 such as a LAN or WAN through a wired connection 51. The processing unit 26 communicates with the retailer's network 25 during the checkout procedure in order to obtain information, such as pricing information, associated with an item being scanned, weighed, or otherwise entered, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the retailer's network 25.

The processing unit 26 communicates with the memory device 27 via a data communication line 53. The memory device 27 is provided to maintain an electronic transaction table which includes a record of the product information associated with each item that is scanned, weighed, or otherwise entered during the customer's use of the self-service checkout terminal 10. For example, if the customer scans a can of soup, the description of the soup and the pricing information associated therewith is recorded in the transaction table in the memory device 27. Similarly, if the customer weighs a watermelon with the product scale 12 and then enters a product lookup code associated with watermelon via the data input device 34, product information associated with the watermelon is recorded in the transaction table.

It should therefore be appreciated that the sum of each of the items recorded in the transaction table (1) minus any reductions (e.g. coupons), and (2) plus any applicable taxes is the amount that the customer pays for his or her transaction. Moreover, data stored in the transaction table is printed out on the printer 36 thereby generating a receipt for the customer at the end of his or her transaction.

Figure 3:
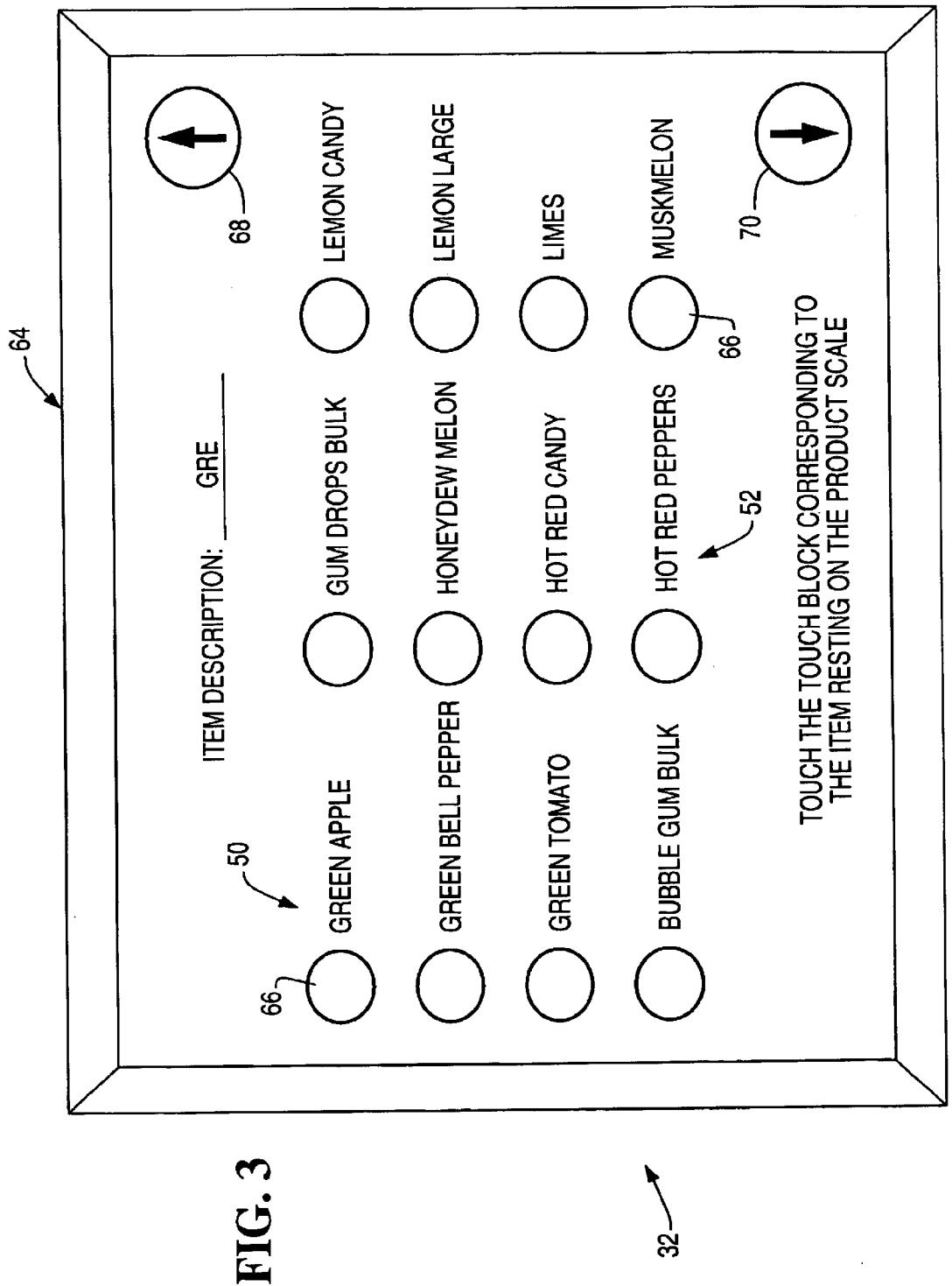
FIGS. 3–8 illustrate various screen displays which are displayed on the display monitor during operation of the self-service checkout terminal of FIG. 1.

The memory device 27 is also utilized to store a plurality of instructions or a code which are utilized to generate an item selection menu 50 a portion of which is shown in FIG. 3. The item selection menu 50 includes an item list 52 which has a number of item names included therein. The item list 52 preferably includes the item name of every un-scannable item sold by the retailer (although only a small portion of the item list 52 is shown in FIG. 3). In particular, as shown in FIG. 3, the item list 52 is not separated by categories (e.g. fruits, vegetables, bulk foods, etc.), but rather is a "super list" of all of the un-scannable items sold by the retailer. As shall be discussed below in more detail, the self-service checkout terminal 10 is configured such that the customer can quickly and easily "jump" to the portion of the item list 52 which includes the item name of the item that he or she is attempting to enter into the terminal 10.

In order to facilitate a customer's search for the item name associated the un-scannable item that he or she is attempting to enter into the self-service checkout terminal 10, the item list 52 has "redundant" item names included therein. In particular, if the name of given item includes more than one word (i.e. a multi-word item name), the item list 52 includes a number of different versions of the item name. For example, the item name "GREEN BELL PEPPER" would appear in the item list 52 of the item selection menu 50 in three versions. A first version of the item name would appear as it is initially written, namely "GREEN BELL PEPPER". A second version of the item name would appear as "BELL GREEN PEPPER", whereas a third version of the item name would appear as "PEPPER GREEN BELL". It should be appreciated that each of the different versions of the item name would be alphabetically organized in the portion of the item list 52 containing other item names which begin with the same letter as the first word of each version. In particular, the first version of the item name (i.e. "GREEN BELL PEPPER") would alphabetically appear in the portion of the item list 52 with other words which begin with the letter "G". Similarly, the second version of the item name (i.e. "BELL GREEN PEPPER") would alphabetically appear in the portion of the item list 52 with other words which begin with the letter "B", whereas the third version of the item name (i.e. "PEPPER GREEN BELL") would alphabetically appear in the portion of the item list 52 with other words which begin with the letter "P". Hence, from the above discussion, it should be appreciated that the customer should be able to find at least one version of an item name irrespective of which order he or she thinks the words of the item name should appear.

The self-service checkout terminal 10 generates the item list 52 from the various databases maintained during operation of a typical retail system. In particular, the processing unit 26 communicates with the network 25 so as to retrieve each list or collection of group lists maintained on the central server (not shown) associated with the retailer's operation. The processing unit then combines all of the retrieved lists into a single list 52 (e.g. a "super list") and thereafter disregards or otherwise removes any item name on the list 52 which has a zero dollar ($0) price associated therewith (such a zero dollar price typically indicates that the item is not currently being sold in the store). Thereafter, the processing unit 26 alters the item list 52 so as to convert all separators (e.g. '(', ')', '/', '-', and '&') to single spaces. Once done, the processing unit 26 again alters the item list 52 so as to remove all redundant spaces such that only a single space separates each word of a multi-word item name. Hence at this point, an item name which was listed on a retrieved vegetable list as "TOMATO (VINE RIPENED)" would appear as "TOMATO VINE RIPENED".

Figure 4:
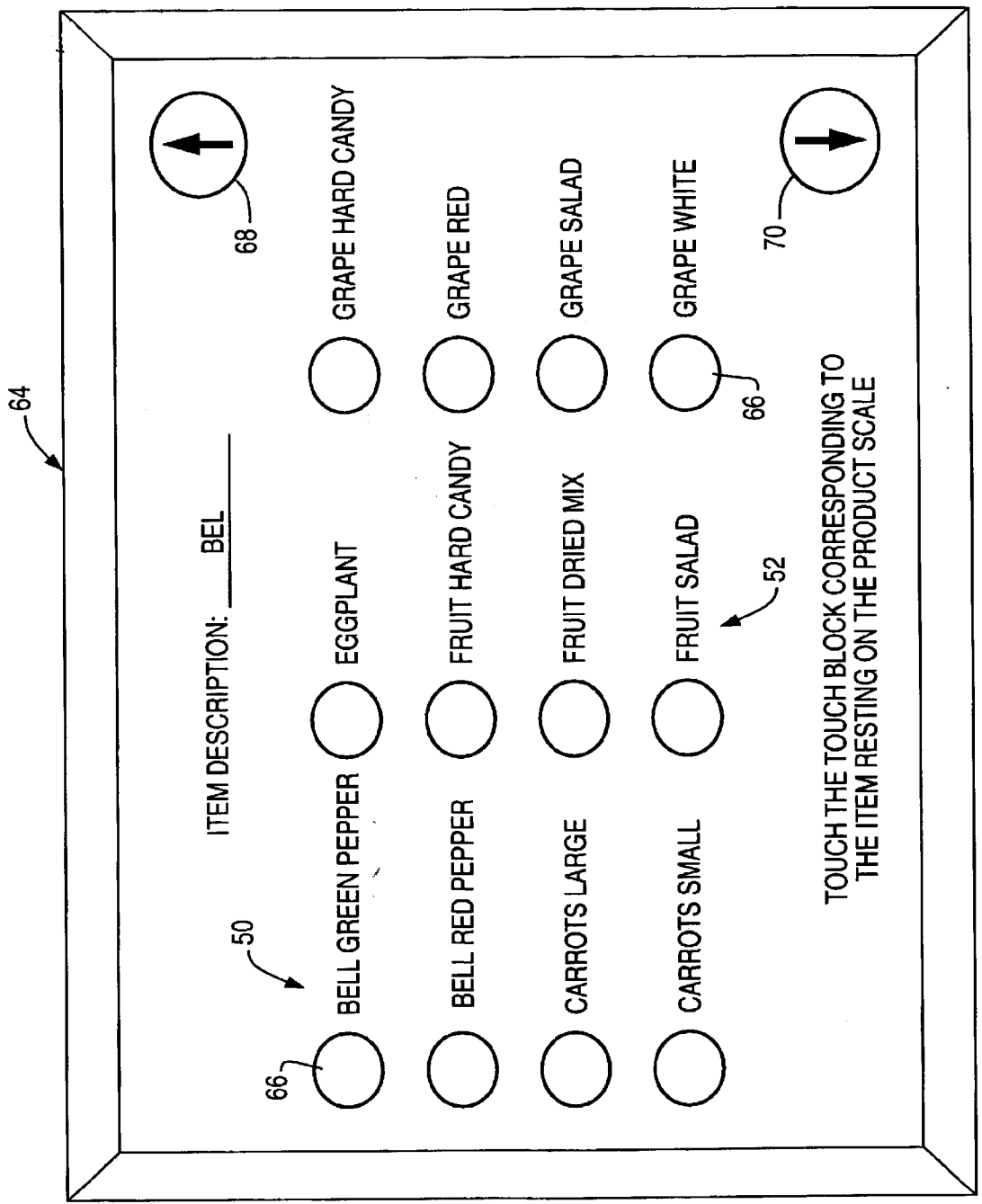
Figure 5:
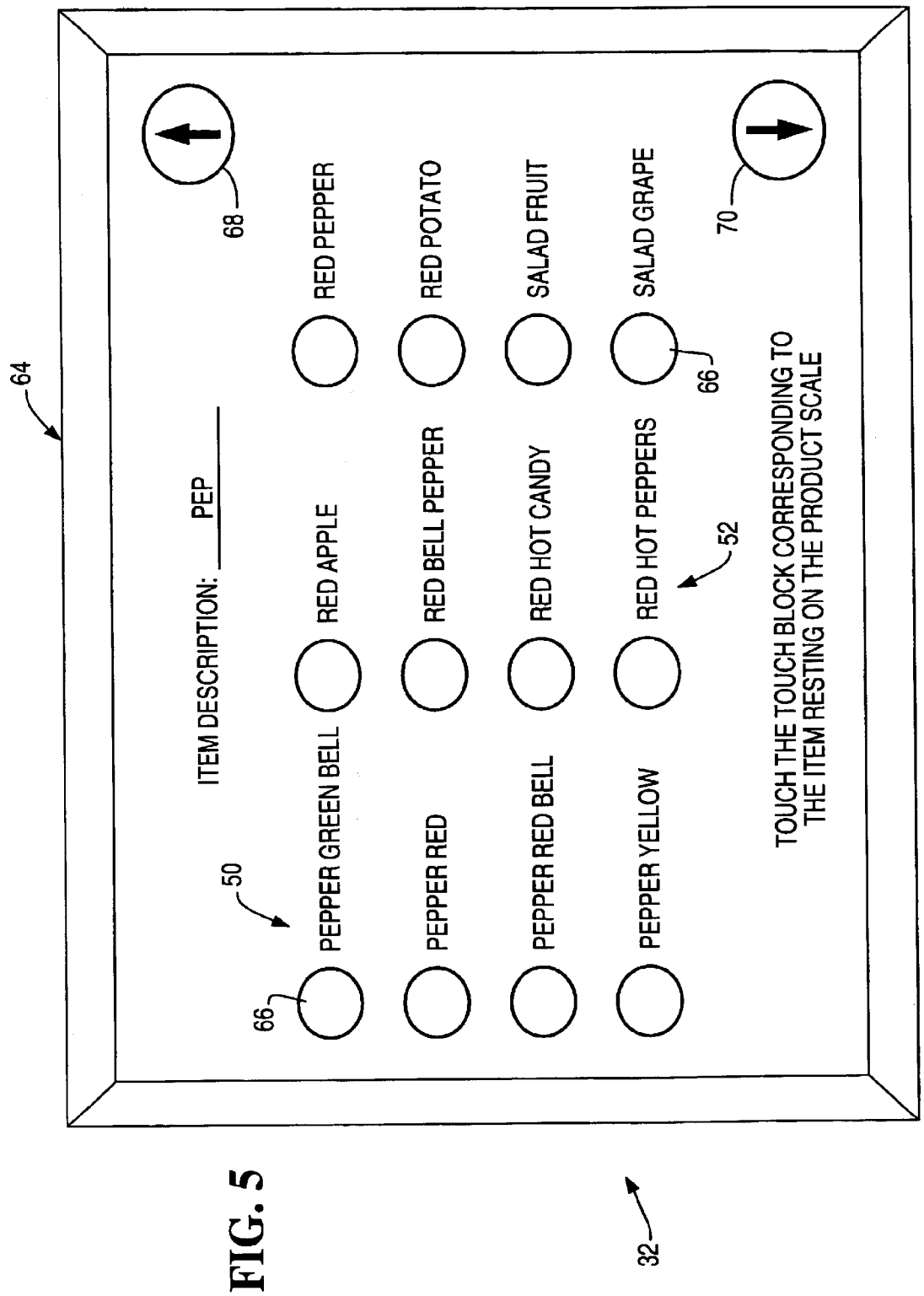

For each multi-word item name in the item list 52, a number of different versions are then created. In particular, if the item name includes three words (e.g. "TOMATO VINE RIPENED"), three versions of the item name will be created. Each version will begin with a different word followed by the remaining words in the item name which are ordered so as to retain their original order in order to best keep the spirit of the original item name. For example, as shown in FIGS. 3–5, the item name "GREEN BELL PEPPER" would be included in the item list 52 in three different versions—"GREEN BELL PEPPER", "BELL GREEN PEPPER", and "PEPPER GREEN BELL". Similarly, the item name "IDAHO BAKERS" would be included in the item list 52 in two different versions "IDAHO BAKERS" and "BAKERS IDAHO". It should be appreciated that each different version of the item name would be alphabetically placed in the item list 52 of the item selection menu 50 based on the first character of the particular version. For example, the version "IDAHO BAKERS" would be placed in the item list 52 with other item names which begin with "I", whereas the version "BAKERS IDAHO" would be placed in the item list 52 with other names which begin with "B".

Figure 6:
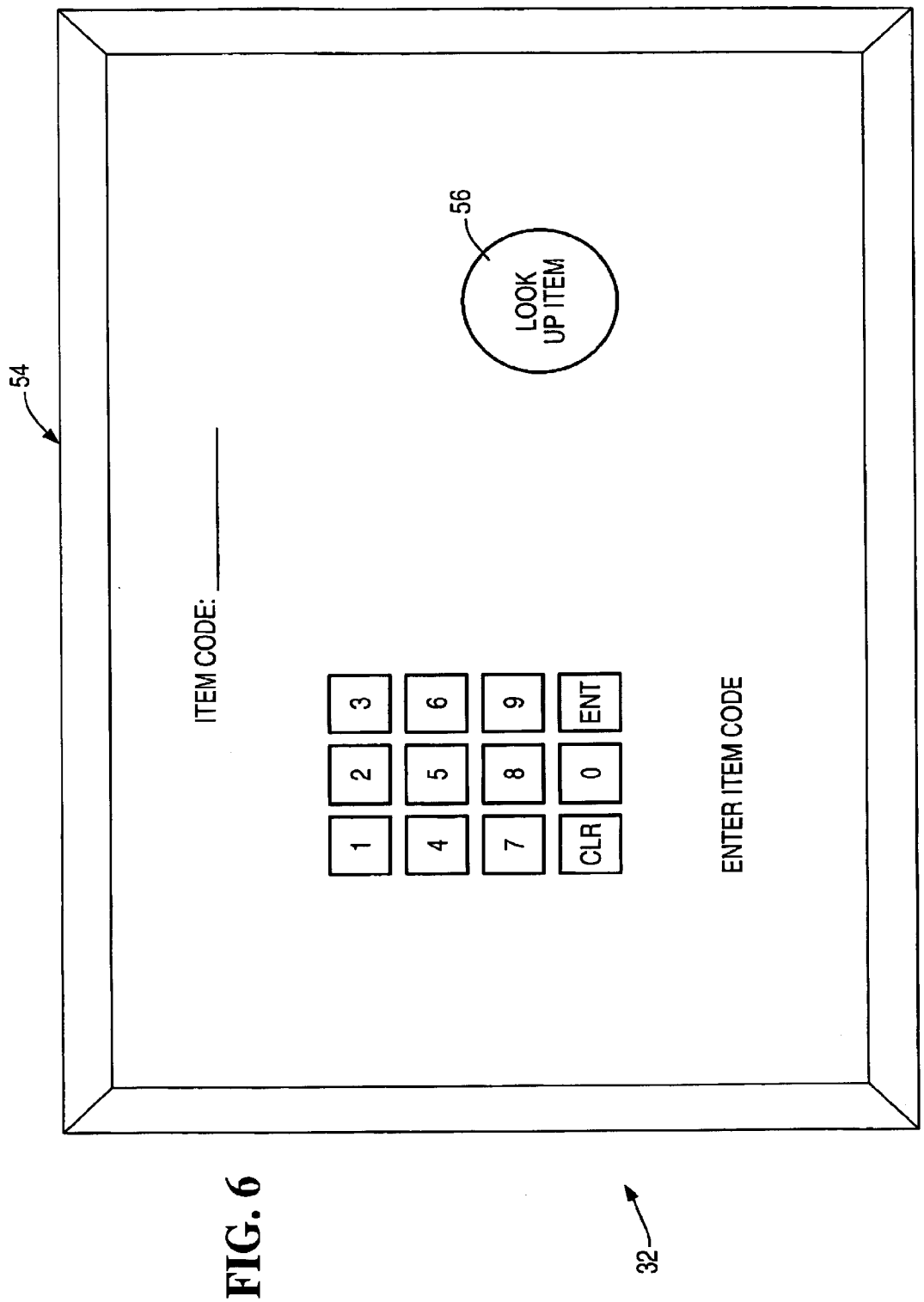
Figure 7:
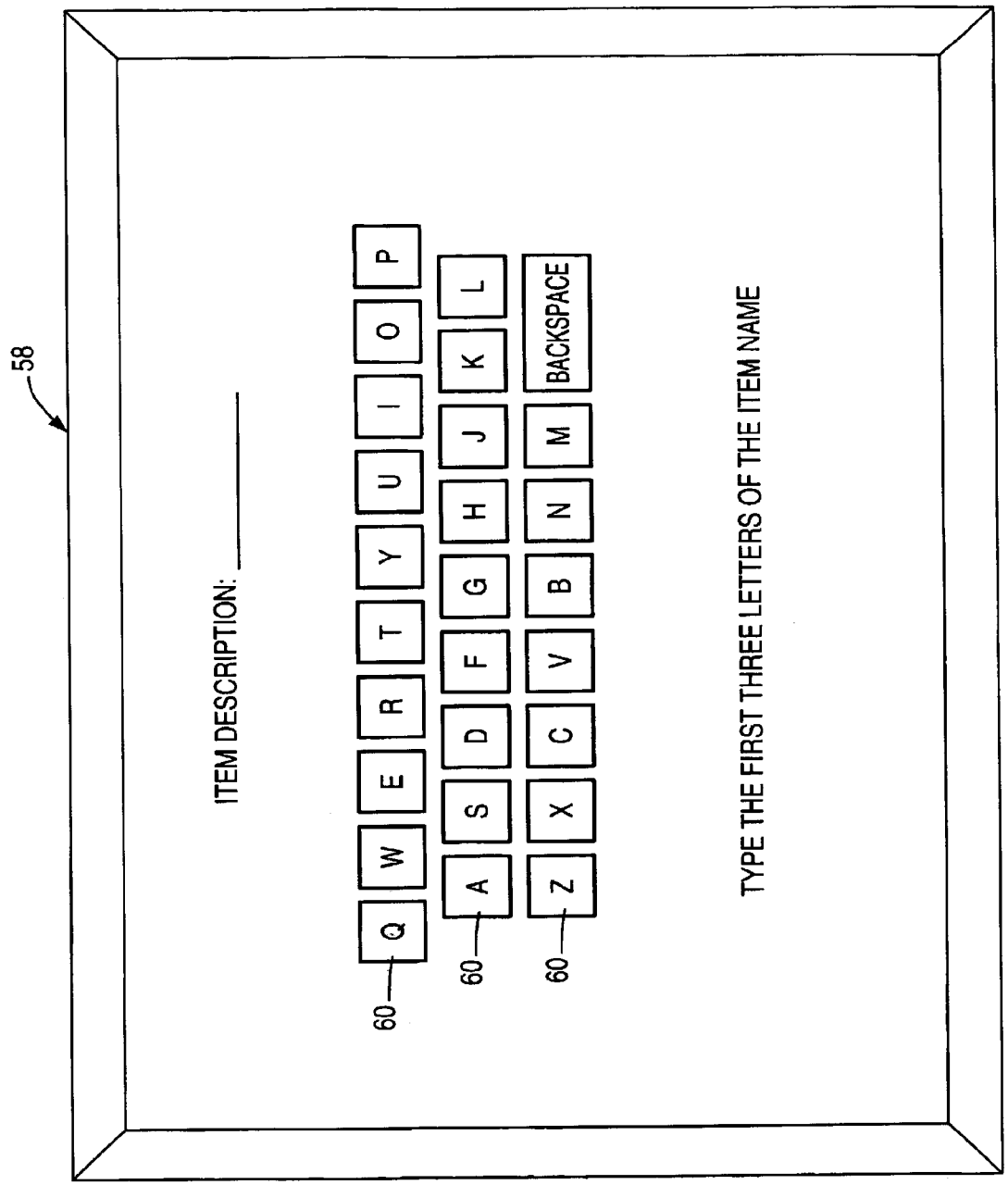

In order to allow a customer to quickly and efficiently enter the item code associated with an un-scannable item, the processing unit 26 causes a number of interface screens to be displayed on the display monitor 32. If the customer indicates that he or she has an un-scannable item to be entered by either placing the un-scannable item on the product scale 12 so as to "trigger" the item code entry process (if the self-service checkout terminal 10 is so equipped) or by touching a particular key on the keypad 34 or a particular touch block on the touch screen associated with the display monitor 32, an initial screen 54 is displayed on the display monitor 32 (see FIG. 6) which instructs the customer to enter the item code associated with the un-scannable item by use of either the keypad 34 or the touch screen associated with the display monitor 32 if the customer already knows the item code associated with the un-scannable item. The initial screen 54 also includes a "LOOK UP ITEM" touch block 56. If the customer does not know the item code associated with the un-scannable item, the customer may touch or otherwise actuate the LOOK UP ITEM touch block 56 so as to cause a character entry screen 58 to be displayed on the display monitor 32 (see FIG. 7). The character entry screen 58 includes an instruction which instructs the customer to enter the first three letters or characters of the name associated with the un-scannable item. As shown in FIG. 7, the character entry screen 58 includes a number of touch blocks 60 which mimic a keyboard. Hence, if the customer touches the touch block 60 associated with the letter "B", a "B" is input into the self-service checkout terminal 10.

Figure 8:
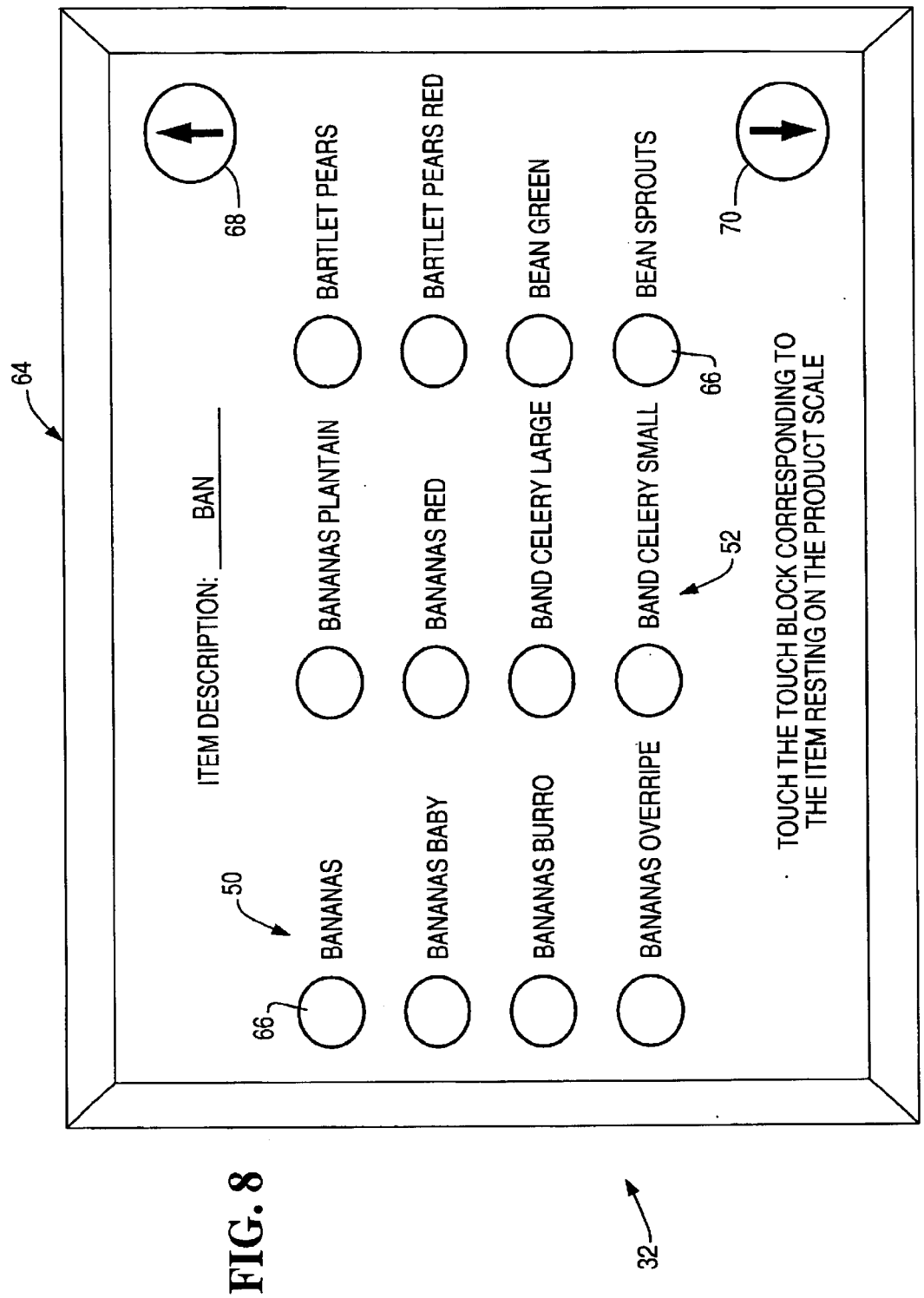

Once the customer has entered a number of characters (e.g. the first three letters of the item name), a character-entered control signal is generated thereby causing a section of the item selection menu 50 to be displayed as an item selection screen 64 on the display monitor 32 as shown in FIG. 8. The section of the item selection menu 50 displayed on the item selection screen 66 includes the portion of the item list 52 which has the item names which most closely match the characters (e.g. letters) entered by the customer. For example, if the customer entered the letters "BAN", the portion of the item list 52 containing item names which begin with the letters "BAN" is displayed on the display monitor 32 as shown in FIG. 8. It should be appreciated that if no item names match the three-letter combination entered by the customer, the processing unit 26 retrieves the portion of the item list 52 which contains item names which most closely match the entered letters. For example, if the customer entered the letters "BAM" and the item list 52 is devoid of item names which begin with the letters "BAM", the processing unit 26 would retrieve the same portion of the item list 52 shown in FIG. 8.

Each of the item names included in the portion of the item list 52 displayed on the display monitor 32 has a touch block 66 associated therewith. If the customer touches the touch block 66 associated with a given item name, an item-entered control signal is generated. The processing unit 26 enters a record corresponding to the entered un-scannable item in response to generation of the item-entered control signal. In particular, the processing unit 26 retrieves product information such as a price-per-pound cost and description from the network 25 and thereafter calculates the price of the un-scannable item by multiplying the weight of the item (as determined by the product scale 12 if the un-scannable item is positioned thereon) times the price-per-pound cost of the item. Thereafter, the processing unit 26 communicates with the memory device 27 so as to store a record corresponding to the entered item in the transaction table. As described to above, the contents of the transaction table are utilized by the processing unit 26 to determine the customer's total cost for his or her transaction.

Moreover, the item selection screen 64 includes an instruction in the form of a pair of scroll "keys" 68, 70 which the customer may utilize to enter a menu-change request if the item name which the customer desires to input is not included in the portion of the item menu 52 displayed on the item selection screen 64. If the customer touches one of the scroll keys 68, 70 a menu-change control signal is generated thereby causing a different portion of the item list 52 containing additional item names to be displayed on the display monitor 32 for consideration by the customer.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, although as described herein the customer enters three letters before a portion of the item list 52 is displayed, it should be appreciated that a portion of the item list 52 may displayed as soon as any number of characters (i.e. letters) have been entered by the customer. For example, a portion of the item list 52 may be displayed as soon as the first letter of the item name is entered.

What is claimed is:

1. A method of displaying an item name having a first word and a second word on an item list of an item selection menu of a retail terminal, comprising the steps of:

displaying a first version of said item name on said item list of said item selection menu such that said first word is followed by said second word; and displaying a second version of said item name on said item list of said item selection menu such that said second word is followed by said first word.

2. The method of claim 1, wherein said item name further has a third word, further comprising the steps of:

displaying a third version of said item name on said item list of said item selection menu such that said first word is followed by said second word which is followed by said third word;

displaying a fourth version of said item name on said item list of said item selection menu such that said second word is followed by said first word which is followed by said third word; and displaying a fifth version of said item name on said item list of said item selection menu such that said third word is followed by said first word which is followed by said second word.

3. The method of claim 1, further comprising the steps of:

determining if a user of said retail terminal operates an input device associated with said retail terminal so as to select said first version of said item name from said item list of said item selection menu and generating an item-entered control signal in response thereto; and determining if said user of said retail terminal operates said input device associated with said retail terminal so as to select said second version of said item name from said item list of said item selection menu and generating said item-entered control signal in response thereto.

4. The method of claim 3, further comprising the step of entering a record corresponding to an item associated with said item name in an electronic transaction table in response to generation of said item-entered control signal.

5. The method of claim 1, further comprising the steps of:

displaying an instruction which instructs a user to input a menu-change request if neither said first version of said item name nor said second version of said item name is included in a first portion of said item selection menu displayed with a display monitor associated with said retail terminal;

determining if said user operates an input device associated with said retail terminal so as to input said menu-change request and generating a menu-change control signal in response thereto; and displaying a second portion of said item selection menu with said display monitor in response to generation of said menu-change control signal.

6. The method of claim 1, wherein:

said step of displaying said first version of said item name on said item list of said item selection menu includes the step of displaying said first version of said item name in alphabetical order on said item list of said item selection menu based on said first word, and said step of displaying said second version of said item name on said item list of said item selection menu includes the step of displaying said second version of said item name in alphabetical order on said item list of said item selection menu based on said second word.

7. A method of displaying an item name having a first word, a second word, and a third word on an item list of an item selection menu of a retail terminal, comprising the steps of:

displaying a first version of said item name on said item list of said item selection menu such that said first word is followed by said second word which is followed by said third word;

displaying a second version of said item name on said item list of said item selection menu such that said second word is followed by said first word which is followed by said third word; and displaying a third version of said item name on said item list of said item selection menu such that said third word is followed by said first word which is followed by said second word.

8. The method of claim 7, further comprising the steps of:

determining if a user of said retail terminal operates an input device associated with said retail terminal so as to select said first version of said item name from said item list of said item selection menu and generating an item-entered control signal in response thereto;

determining if said user of said retail terminal operates said input device associated with said retail terminal so as to select said second version of said item name from said item list of said item selection menu and generating said item-entered control signal in response thereto; and determining if said user of said retail terminal operates said input device associated with said retail terminal so as to select said third version of said item name from said item list of said item selection menu and generating said item-entered control signal in response thereto.

9. The method of claim 8, further comprising the step of entering a record corresponding to an item associated with said item name in an electronic transaction table in response to generation of said item-entered control signal.

10. The method of claim 7, further comprising the steps of:

displaying an instruction which instructs a user to input a menu-change request if neither said first version of said item name, said second version of said item name, nor said third version of said item name is included in a first portion of said item selection menu displayed with a display monitor associated with said retail terminal;

determining if said user operates an input device associated with said retail terminal so as to input said menu-change request and generating a menu-change control signal in response thereto; and displaying a second portion of said item selection menu with said display monitor in response to generation of said menu-change control signal.

11. The method of claim 7, wherein:

said step of displaying said first version of said item name on said item list of said item selection menu includes the step of displaying said first version of said item name in alphabetical order on said item list of said item selection menu based on said first word, said step of displaying said second version of said item name on said item list of said item selection menu includes the step of displaying said second version of said item name in alphabetical order on said item list of said item selection menu based on said second word, and said step of displaying said third version of said item name on said item list of said item selection menu includes the step of displaying said third version of said item name in alphabetical order on said item list of said item selection menu based on said third word.

12. A retail terminal, comprising:

a display monitor for displaying an item name having a first word and a second word on an item list of an item selection menu;

a processing unit electrically coupled to said display monitor; and a memory device electrically coupled to said processing unit, wherein said memory device has stored therein a plurality of instructions which, when executed by said processing unit, causes said processing unit to:

(i) display a first version of said item name on said item list of said item selection menu with said display monitor such that said first word is followed by said second word, and (ii) display a second version of said item name on said item list of said item selection menu with said display monitor such that said second word is followed by said first word.

13. The retail terminal of claim 12, wherein:

said item name further has a third word associated therewith, and said plurality of instructions, when executed by said processing unit, further causes said processing unit to:

(i) display a third version of said item name on said item list of said item selection menu with said display monitor such that said first word is followed by said second word which is followed by said third word, (ii) display a fourth version of said item name on said item list of said item selection menu with said display monitor such that said second word is followed by said first word which is followed by said third word, and (iii) display a fifth version of said item name on said item list of said item selection menu with said display monitor such that said third word is followed by said first word which is followed by said second word.

14. The retail terminal of claim 12, further comprising an input device for receiving input from a user of said retail terminal, wherein said plurality of instructions, when executed by said processing unit, further causes said processing unit to:

(i) determine if said user of said retail terminal operates said input device so as to select said first version of said item name from said item list of said item selection menu and generate an item-entered control signal in response thereto, and (ii) determine if said user of said retail terminal operates said input device so as to select said second version of said item name from said item list of said item selection menu and generate said item-entered control signal in response thereto.

15. The retail terminal of claim 14, wherein said plurality of instructions, when executed by said processing unit, further causes said processing unit to enter a record corresponding to an item associated with said item name in an electronic transaction table in response to generation of said item-entered control signal.

16. The retail terminal of claim 12, further comprising an input device for receiving input from a user of said retail terminal, wherein said plurality of instructions, when executed by said processing unit, further causes said processing unit to:

(i) display an instruction with said display monitor which instructs said user to input a menu-change request if neither said first version of said item name nor said second version of said item name is included in a first portion of said item selection menu displayed with said display monitor;

(ii) determine if said user operates said input device so as to input said menu-change request and generate a menu-change control signal in response thereto; and (iii) display a second portion of said item selection menu with said display monitor in response to generation of said menu-change control signal.

17. The retail terminal of claim 12, wherein said plurality of instructions, when executed by said processing unit, further causes said processing unit to:

(i) display said first version of said item name in alphabetical order on said item list of said item selection menu based on said first word, and (ii) display said second version of said item name in alphabetical order on said item list of said item selection menu based on said second word.

* * * * *